United States Patent [19]
Walter

[11] Patent Number: 5,959,540
[45] Date of Patent: Sep. 28, 1999

[54] SINGLE-KEY SECURITY SYSTEM

[76] Inventor: Gerhard Walter, 29 Forbus St., Apt. 12, Poughkeepsie, N.Y. 12601

[21] Appl. No.: 09/075,340

[22] Filed: May 11, 1998

[51] Int. Cl.[6] ........................................... G06F 7/04
[52] U.S. Cl. ............... 340/825.31; 340/825.69; 341/176; 307/10.5; 180/287
[58] Field of Search ................ 340/825.31, 825.69, 340/825.72, 426, 455; 341/176; 180/287; 307/10.2, 10.3, 10.4, 10.5, 10.7; 70/256, 257, 456; 701/49, 48; 704/273

[56] References Cited

U.S. PATENT DOCUMENTS

| | | | |
|---|---|---|---|
| 4,638,293 | 1/1987 | Min | 340/426 |
| 5,177,989 | 1/1993 | Stillwagon | 70/456 |
| 5,467,070 | 11/1995 | Drori et al. | 340/426 |
| 5,479,156 | 12/1995 | Jones | 340/825.31 |
| 5,513,107 | 4/1996 | Gormley | 701/48 |
| 5,561,331 | 10/1996 | Suyama et al. | 307/10.3 |
| 5,563,576 | 10/1996 | Drori et al. | 340/455 |
| 5,774,858 | 6/1998 | Taubkin et al. | 704/273 |

*Primary Examiner*—Edwin C. Holloway, III
*Attorney, Agent, or Firm*—Pillsbury Madison & Sutro, LLP

[57] ABSTRACT

A system for limiting access to certain components of a vehicle where the vehicle has a valet mode wherein access to the certain components of the vehicle is limited and a normal mode wherein the certain components are operable. The vehicle has a processor programmed to place the vehicle in the valet mode upon receipt of a first signal and to place the vehicle in the normal mode up receipt of a second signal. Mode changing signals are transmitted to a processor using a remote control and a connector switch removably connected to the remote control, wherein the remote control transmits the first signal when the connector switch is disconnected from the remote control, and wherein the remote control transmits the second signal when the connector switch is reconnected to the remote control. A radio in the vehicle and/or a voice-recognition system can also be used to transmit the mode changing signals to the processor.

28 Claims, 6 Drawing Sheets

SINGLE-KEY SECURITY SYSTEM

FIELD OF THE INVENTION

This invention relates to security systems for vehicles and, more particularly, to devices for limiting and controlling access to certain components of a vehicle. This invention differs from security systems providing vehicle alarm or vehicle theft deterrent or prevention systems.

BACKGROUND OF THE INVENTION

In many instances it is desirable or necessary to provide limited and restricted access to certain components of a vehicle such as a motor vehicle. For example, when parking a car in a parking lot, it is often necessary to give the car's ignition key to an attendant so that the car can be conveniently moved if necessary. Similarly, when making use of a valet parking service, it is necessary to give a car's ignition key to a valet. At the same time, however, it is clearly generally desirable to limit the attendant or valet's access to certan components or parts of the car such as the trunk, the glove compartment, etc.

Accordingly, many cars have two different keys, one of which (the master key) operates the car's ignition system as well as all other locks (for example, the doors, the trunk, the glove compartment, the fuel door, etc.) and the other of which (the valet key) is limited to the ignition system and the doors. Some cars allow the trunk and fuel door to be opened from within the car, for example, by pulling a lever or pressing a button. It should be noted that in some cases cars are provided only with a single key and therefore no means at all to deny access by a valet to the trunk, glove compartment, etc.

Using the two-key system, various parts of a car can be made inaccessible to a valet, lot attendant and the like.

In some of the more expensive motor vehicles, all externally operable locks (except the door locks) have been eliminated. This helps prevent unauthorized access by those who would pick the locks or remove them to gain access. The trunk and fuel door have electric locks which can be operated using buttons on the dashboard and buttons on a remote control.

There are other approaches to limiting and/or controlling vehicle access. For example, some cars have a button or switch which must be pressed in order to switch to valet mode. One example of this is found in the 1998Cadillac Eldorado which has a valet mode which is activated by a valet button in the car's glove compartment. Once the button is pressed, the glove compartment must be locked with a special glove compartment key. In this car the ignition or master key does not open the glove compartment.

These two-key systems of access control have a number of problems, including, at a minimum, that they require that two keys be carried and separated whenever a valet or like service is used. If the wrong key is mistakenly given to a valet or lot attendant then security is lost. Second, the two-key systems effectively require a car to be divided into two distinct and fixed zones, one of which is accessible only with the master key.

SUMMARY OF THE INVENTION

This invention overcomes the above and other problems by providing a single-key security system that operates automatically, conveniently and in a fail-safe manner.

It is desirable to have a vehicle access control system that does not require separate keys. It is further desirable to have a vehicle access control system that is not limited to only two fixed zones.

Accordingly, in one aspect, this invention provides a system for limiting access to certain components of a vehicle, the vehicle having a valet mode wherein access to certain components of the vehicle is limited and a normal mode wherein the certain components are operable, the vehicle having a processor programmed to place the vehicle in the valet mode upon receipt of a first signal and to place the vehicle in the normal mode upon receipt of a second signal. The system includes a remote control; and a connector switch removably connected to the remote control. The remote control transmits the first signal when the connector switch is disconnected from the remote control, and wherein the remote control transmits the second signal when the connector switch is reconnected to the remote control.

In another aspect, this invention is a device for controlling a vehicle, the vehicle having a valet mode wherein certain components of the vehicle are inoperable and a normal mode wherein the certain components are operable, the vehicle comprising a processor programmed to place the vehicle in the valet mode upon receipt of a first signal and to place the vehicle in the normal mode upon receipt of a second signal. The device has a remote control; and a connector switch removably connected to the remote control. The remote control transmits the first signal when the connector switch is disconnected from the remote control, and wherein the remote control transmits the second signal when the connector switch is reconnected to the remote control.

In yet another aspect, this invention is a method of controlling access to certain components of a vehicle using a controlling device, the vehicle having a valet mode wherein certain components of the vehicle are inoperable and a normal mode wherein the certain components are operable, the vehicle having a processor programmed to place the vehicle in the valet mode upon receipt of a first signal and to place the vehicle in the normal mode up receipt of a second signal, the controlling device comprising a remote control; and a connector switch removably connected to the remote control, wherein the remote control transmits the first signal when the connector switch is disconnected from the remote control, and wherein the remote control transmits the second signal when the connector switch is reconnected to the remote control. The method includes disconnecting the connector switch from the remote control, whereby the first signal is transmitted to the vehicle and the vehicle is placed in valet mode. In some embodiments the method further includes reconnecting the connector switch to the remote control, whereby the second signal is transmitted to the vehicle and the vehicle is placed in normal mode.

In still another aspect, this invention is a vehicle security system which includes a remote control and a key ring having a connector switch removably connected to the remote control. In some embodiments the remote control transmits a signal when the connector switch is disconnected from the remote control and the remote control transmits the second signal when the connector switch is reconnected to the remote control.

This invention provides numerous advantages over existing systems. For instance, for the single key vehicles, this invention offers a level of valet-mode protection previously unavailable. Further, with single or dual key systems, this invention offers the advantages of simplicity while at the same time making it unlikely that a person will forget to put his car in valet mode.

In particular, by having a single key on a key ring together with the connector, and by having the simple act of separating the key from the remote control automatically cause the vehicle to enter valet mode, the system of this invention has distinct advantages over prior systems. These advantages are expanded by the further operation of the system such that the vehicle returns to normal mode when the key is reattached to the system.

BRIEF DESCRIPTION OF THE DRAWNGS

The above and other objects and advantages of the invention will be apparent upon consideration of the following detailed description, taken in conjunction with the accompanying drawings, in which the reference characters refer to like parts throughout and in which:

FIGS. 3–5B depict various embodiments of the controller/connector switching mechanism according to this invention.

DETAILED DESCRIPTION OF THE PRESENTLY PREFERRED EXEMPLARY EMBODIMENTS

Figure 1:
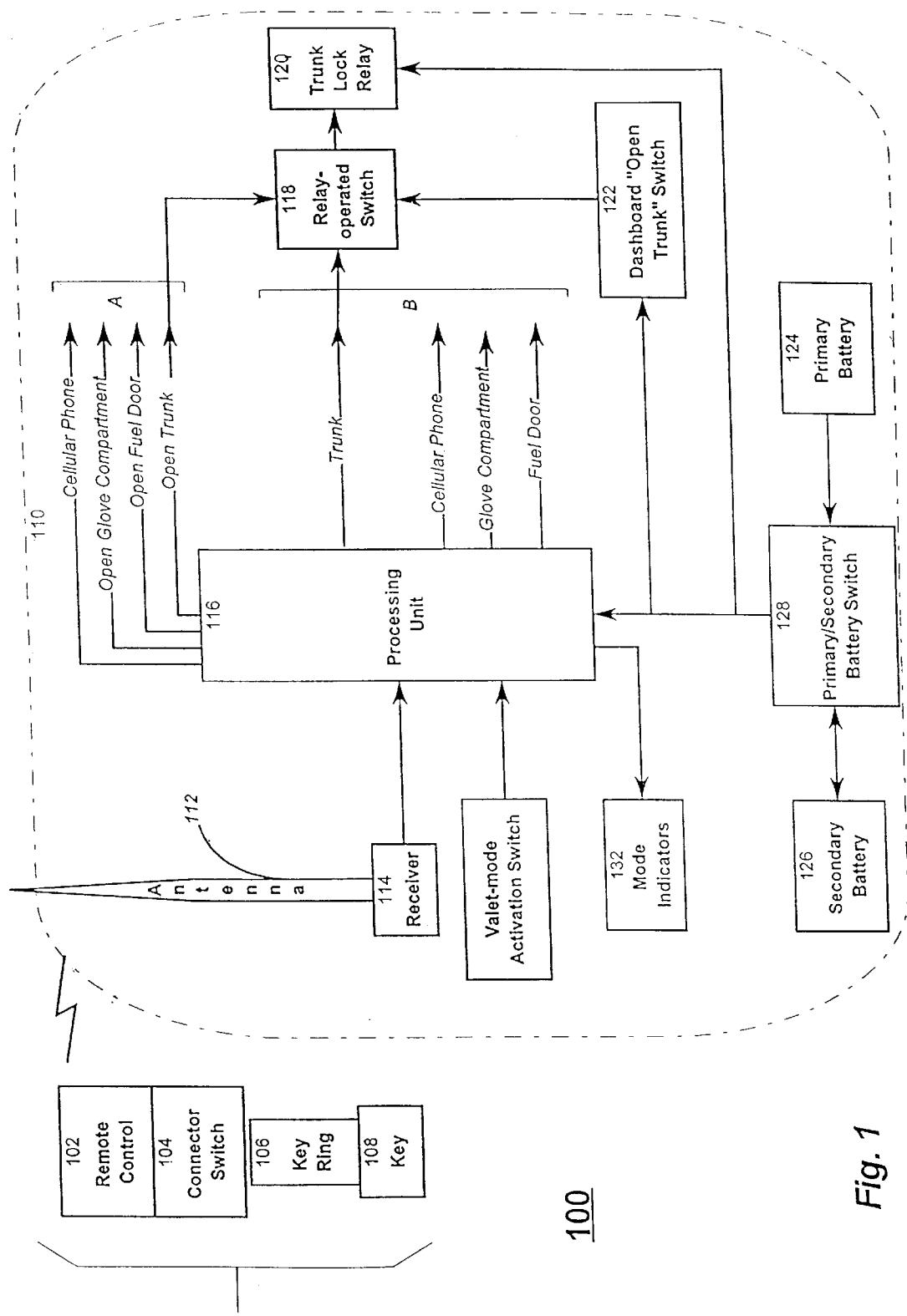
FIG. 1 is a schematic depiction of the single-key security system operating with a motor vehicle.

With reference to FIG. 1, the single-key security system 100 of this invention includes a remote control 102 connected to a connector switch 104. The connector switch 104 is itself connectable to a key ring 106 which has one or more keys 108 thereon. A vehicle 110 has an antenna 112 connected to a receiver 114. The antenna 112 can be the vehicle's AM/FM radio antenna, a cellular telephone antenna or a separate antenna specifically for use with the system 100. The receiver 114 receives radio frequency signals (via the antenna 112) on a specific preset frequency and provides the received signals to a processing unit 116. Preferably one of the keys 108 on the key ring 106 is the master key of the vehicle 110.

Preferably the remote control 102, receiver 114 and the antenna 112 are the same ones used to control other aspects of access to the vehicle 110, and which are typically provided by the vehicle manufacturer or with the vehicle's security system. It is desirable that a user of the system not have to use more than one remote control for a vehicle.

The receiver 114 and the processing unit 116 can be integrated into the same device or they can be separate devices. The processing unit 116 is programmed to switch the vehicle 110 into various modes, depending on the signal received by the receiver 114 and possibly depending on the current state of the vehicle 110.

The processing unit 116 produces two kinds of output. For the sake of this description, the outputs are distinguished as those coming out of the top of the processing unit 116 in FIG. 1 (designated "A" ), and those coming out of the right-hand side of the processing unit in FIG. 1 (designated "B" ). Functionally, the two kinds of output differ as follows:

The "A" output signals (shown in FIG. 1 coming out of the top of the processing unit 116) are used to-control the various devices and parts of the vehicle. For example, the "A" output signal designated "Open Glove Compartment" causes the glove compartment to be opened and the "Open Trunk" signal causes the vehicle's trunk to be opened. These "A" output signals are sent by the processing unit 116 in response to either buttons being depressed on the remote control 102 or, in some cases, depression of buttons or switches in the vehicle itself.

The "B" output signals (shown coming out of the right side of the processing unit 116 in FIG. 1) are current path cutting and restoring output signals. For example, the "B" output signal designated "Trunk" cuts or restores power to the trunk relay-operated switch 118. When the power to the trunk relay-operated switch 118 is cut, the trunk lock relay 120 effectively becomes inoperable and the trunk cannot be opened, unlocked (or locked) using the dashboard "Open Trunk" switch 122 or an "Open Trunk" ("A" ) signal sent from the processor 116.

The operation of these signals are described in greater detail with reference to the vehicle's trunk. Analogous operation for the cellular phone, glove compartment, fuel door and other vehicle components is provided by this system (although not described).

A relay-operated switch 118 is positioned between the processing unit 116 and a trunk lock relay 120. An "Open Trunk"switch 122 is located on the vehicle's dashboard or in some other convenient location. The switch 122 is connected to the relay-operated switch 118. The relay-operated switch 118 is also provided with an "A" output signal from the processing unit 116.

In order to limit current drain on the system (except during the short time when the security state is changed), when the trunk is to have its current path cut or restored, the system sends an electrical pulse to the relay-operated switch 118, which is a Push On - Push Off Switch.

When the trunk relay-operated switch 118 is in an "On" position, it allows current to flow to the trunk lock relay coil 120, and when the switch 118 is in an "Off" position, it cuts the current path to the trunk lock relay coil 120. If the switch 118 is in the "Off" position, a current pulse received from, for example, the dashboard "Open Trunk" switch 122 will not go through the switch 118 to the trunk lock relay 120 (that is, the system is in valet mode). Alternatively, if the switch 118 is in an "On" position, a current pulse from an "A" "Open Trunk" signal or from the dashboard "Open Trunk" switch will go to the trunk lock relay 120, closing the normally open contact points and allowing power to pass to a trunk lid release magnet.

The portion of system 100 that is in the vehicle 110 is powered by a primary battery 124 which is preferably the vehicle's battery. A secondary battery 126 provides backup power in the case of a power failure in the primary battery 124. A battery switch 128 automatically switches power from the primary battery 124 to the secondary battery 126 when the voltage of the primary battery 124 drops below a predetermined value. The system prevents current from flowing from the secondary battery 126 to the primary battery 124. Preferably some indication of power failure and battery switch-over is provided. The system can be provided with a manual switch-over to the secondary battery 126 if the automatic switch fails or is not provided.

Preferably the secondary battery 126 is rechargeable and is kept charged by the normal operation of the vehicle 110.

The secondary battery 126 need only supply enough power to operate the security system 100 a few times, perhaps only once, since the vehicle 110 is itself not operable and one would either want to take one's belongings out of the vehicle by setting the system state to "normal mode" or to lock them safely in the vehicle by setting the state to "valet mode". This backup power supply allows a user to lock or unlock valet-mode-controllable units of the vehicle 110 in the case of a main power failure, for example, to use the vehicle's phone to make an emergency call, to open the trunk to get jumper cables, etc. If the vehicle supplies power to equipment like a cellular phone that could be used in an emergency, possibly for an appreciable length of time, a more powerful secondary battery would be installed. Also, the high/low-power-consumption radio (described below) could be used to allow for radio reception in an emergency situation.

In operation, the remote control 102 transmits a signal, preferably an electromagnetic signal such as a radio frequency signal, when it is separated from the connector switch 104. The remote control 102 also transmits a signal when it is reconnected to the connector. In some embodiments the signals transmitted upon separation and connection are the same. In some embodiments the signal is an infrared or ultrasonic signal.

When used in conjunction with the receiver 114 and processing unit 116, the remote control 102 and the connector switch 104 are used automatically to transmit a signal to the processing unit 116 via the receiver 114.

In preferred embodiments, the signal transmitted by the remote control 102 is used by the processing unit 116 to activate or deactivate, automatically, a valet security mode of the vehicle 110. In valet mode control of and access to various parts of the vehicle 110, (including but not limited to its glove compartment, trunk, cellular phone and fuel door) may be denied. In order to control access to these parts of the vehicle 110, the processing unit 116 sends signals ("B" signals in FIG. 1) for disabling the opening mechanisms for each of those devices by cutting the current path to each respective device.

The particular definition of "Valet Mode" is vehicle specific. In "Valet Mode," some parts of the vehicle may be locked, regardless of their state prior to entering valet mode. Other parts of the vehicle may be left in their prior state locked or not) when valet mode is entered. The trunk and fuel doors, for example, are normally locked and are opened either by pushing a button on the dashboard or on the remote control. In some vehicles, e.g, the Cadillac Catera, the processor ignores commands from the trunk opening buttons on the dashboard and the remote control while the vehicle is in motion.

By way of example, the locking mechanism for the trunk is shown in FIG. 1, the other mechanisms operate in similar manners for the mechanical devices (that is, for the glove compartment and fuel door). The locking of electrical systems and devices such as the cellular phone is performed by comparable electrical switching.

To prevent by-passing of the security system, the signal lines from the processing unit 116 to the various devices are made as inaccessible as possible.

To further prevent by-passing of the security system, the signals transmitted by remote control 102 can include a preset code specific to that remote control/vehicle pair. This code can be factory set or can be settable by the user. In some embodiments the processing unit 116 and remote control 102 can select communication security codes, for example, in the same manner as is presently done with portable telephones. In this way, someone using another controller will not be able to access the vehicle.

Figure 2:
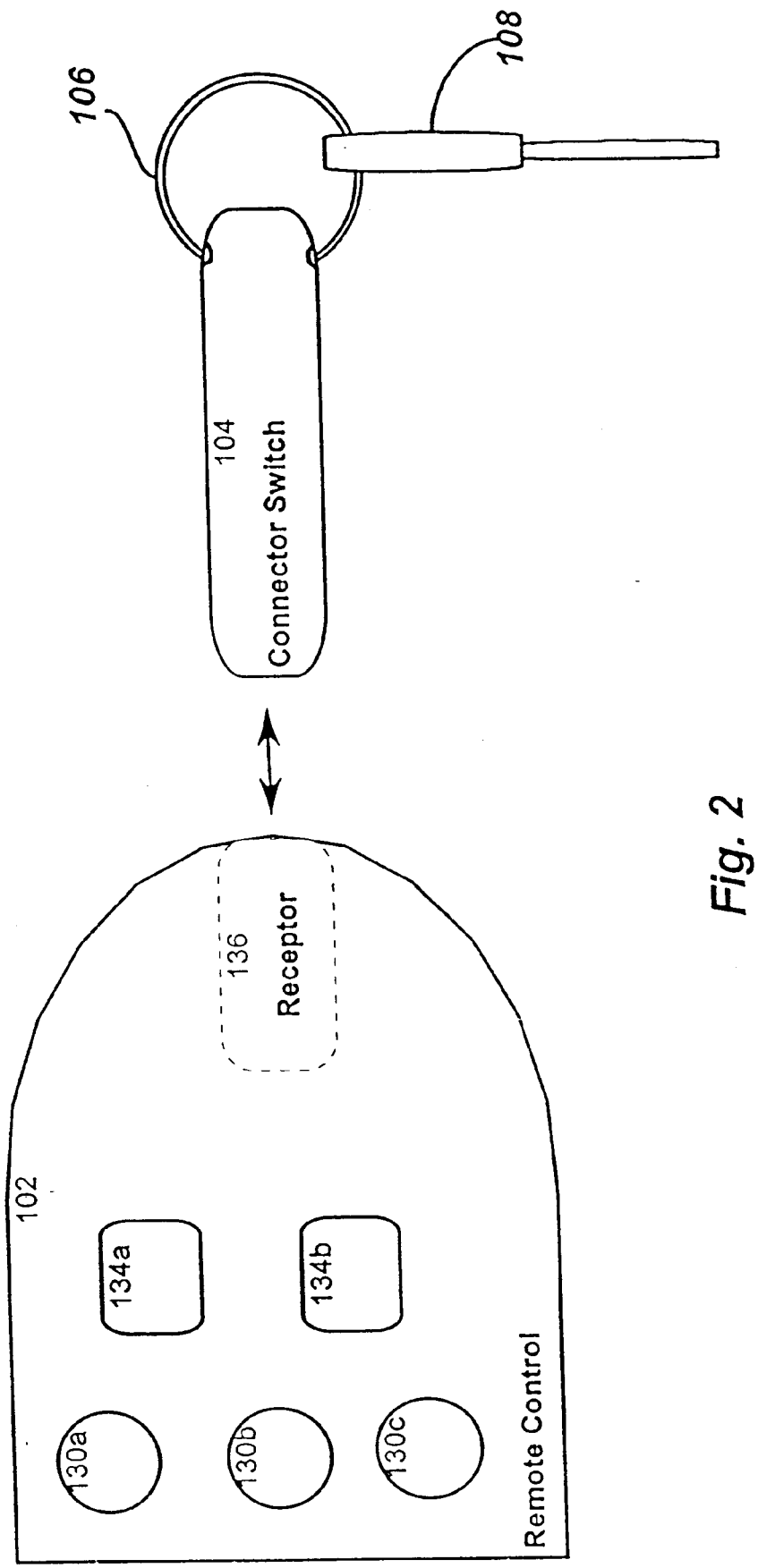
FIG. 2 shows the remote control/connector of FIG. 1 in greater detail.

FIG. 2 shows an embodiment of the remote control 102 and connector switch 104 in greater detail. As shown in FIG. 2, the connector switch 104 is insertable (and removable) from a receptor 136 in the remote control 102. When the connector switch 104 is removed from or inserted into the receptor 136, the remote control 102 transmits a signal. Various embodiments of the connector switch 104 and receptor 136 are described in greater detail below, along with a more detailed description of their operation.

In some embodiments the remote control 102 includes one or more buttons 130a–130c which can be used to operate and control other aspects of the vehicle's security. The buttons 130a–130c can be used in conjunction with the connector switch 104 or independently thereof In some embodiments, a different signal is transmitted by the remote control, depending on which, if any, of the buttons 130a–130c are depressed when or after the connector switch 104 is separated from or reconnected to the remote control 102. In this manner different systems and devices in the vehicle 110 can be independently controlled. For example, in the Valet Mode, if, on the remote control the "Open Trunk" button is depressed, the current path to the trunk will be restored, so that it can be opened with its dashboard or remote control button. In general, one or more of any of the devices which had their current path cut (by the vehicle being put in Valet Mode) can have that path restored by depression of one or more buttons on the remote control. If the standard remote control has no buttons available for the particular devices/components of the vehicle (e.g., the glove compartment and the cellular phone), these buttons can be added to provide for this additional functionality.

As noted above, in addition to the functions of this invention, preferably the remote control 102 performs the same functions as existing remote controls and has the same buttons as existing remote controls. For example, the remote control of the Cadillac Catera has buttons for "Open Door" (push once for driver's door, twice for other doors), "Lock" all doors including fuel door; "Open Trunk" and "Open Fuel Door". If the Catera has a security system, pushing the "Lock Door" button again will arm it and pushing the "Open Door" button will disarm it.

Preferably the system includes one or more mode indicators 132 showing the system's current state. When the system is used with a motor vehicle 110, the mode indicators 132 are provided on the vehicle's dash board or instrument panel or in a location visible to the vehicle's driver. In the case of a two-mode vehicle (having a normal mode and a valet mode) a mode indicator would light up with the words "Valet Mode" or an icon depicting the valet mode whenever the vehicle 110 was in valet mode, with individual icons lit up showing which components of the vehicle are inoperable, e.g., whenever the ignition key is turned on or off or a mode change is made. Since normal mode is the default, there is generally no need to indicate this mode on an indicator.

The mode indicators 132 also emit a sound, for example, a chime, when the mode is changed.

The remote control 102 also includes one or more mode indicators 134a–134b, preferably LEDs. The mode indicators 134a–134b are used to indicate the mode the system is in. In a two-mode system, a single LED can indicate the mode, however, in a multi-mode system (for example, when the valet mode has degrees of control available), multiple LEDs or a single LED flashing with different frequencies and/or pulse lengths can indicate the mode. As with the mode indicators 132 in the vehicle 110, the mode indicators 134a–134b can also emit a sound whenever the mode is changed.

Preferably both sets of mode indicators are extinguished after a predetermined fixed period of time, e.g, one minute. However, the remote control 102 can store the mode and indicate it on the mode indicators 134*a*–134*b* in response, for example, to pressing one of the buttons 130*a*–130*c* or some other button. In this way a user can check the remote control 102 to see what mode the vehicle 110 was left in even after the mode indicators 134*a*–134*b* have been extinguished.

Various embodiments of mechanisms for the connector switch 104 and receptor 136 are now described with reference to FIGS. 3–5B. Recall that when the connector switch 104 is removed from or inserted into the receptor 136, the remote control 102 generates and transmits a signal. The general approach is for the removal and/or insertion of the connector switch 104 into the receptor 136 to either momentarily close a normally open circuit in the remote control 102 or to momentarily open a normally closed circuit.

As noted, preferably the remote control 102 is the same one which controls other aspects of the vehicle's security system. Such remote controls are well known. The present invention requires modification of a standard remote control to include the connector switch 104. In some cases this modification might require slight enlargement of the housing of the remote control.

Figure 3:
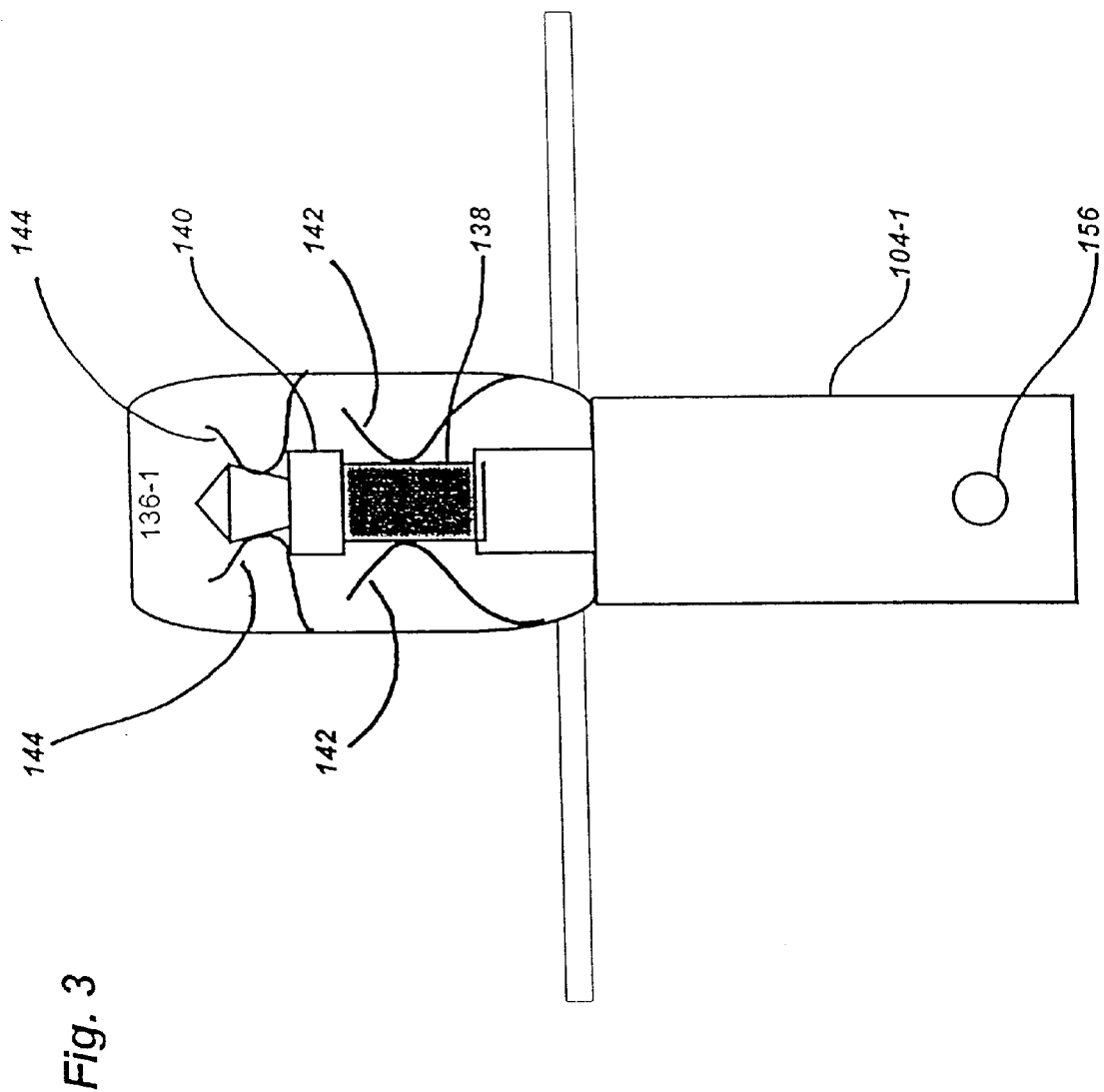

With reference to FIG. 3, in one embodiment the connector switch 104-1 and receptor 136-1 have a structure like a standard audio plug and jack. However, the plug has an insulated portion 138 and an electrically conductive portion 140. Preferably a small plug, for example, one with a sub-miniature diameter of 3/32"is used. In operation, when the connector switch 104-1 is pushed into (or removed from) the receptor 136-1 the two spring electrodes 142 are momentarily connected (as the conductive portion 140 of the connector switch 104-1 passes over them). When fully inserted into the receptor 136-1, the insulated portion 138 of the connector switch prevents closure of the circuit containing the spring electrodes 142. In this manner the required (momentary) closing of a circuit is performed and the remote control 102 generates and transmits the appropriate signal.

Figure 4:
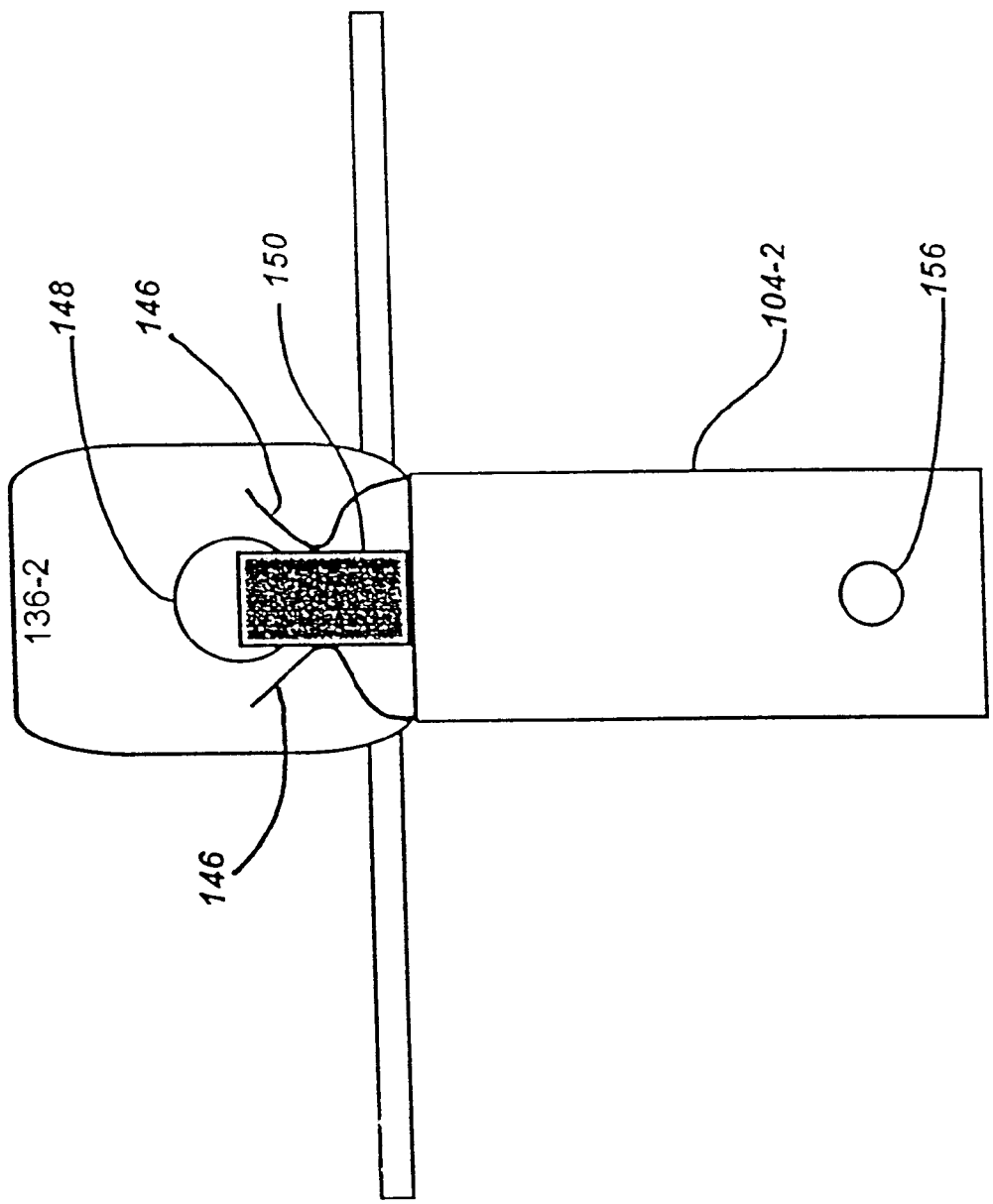
Figure 5:
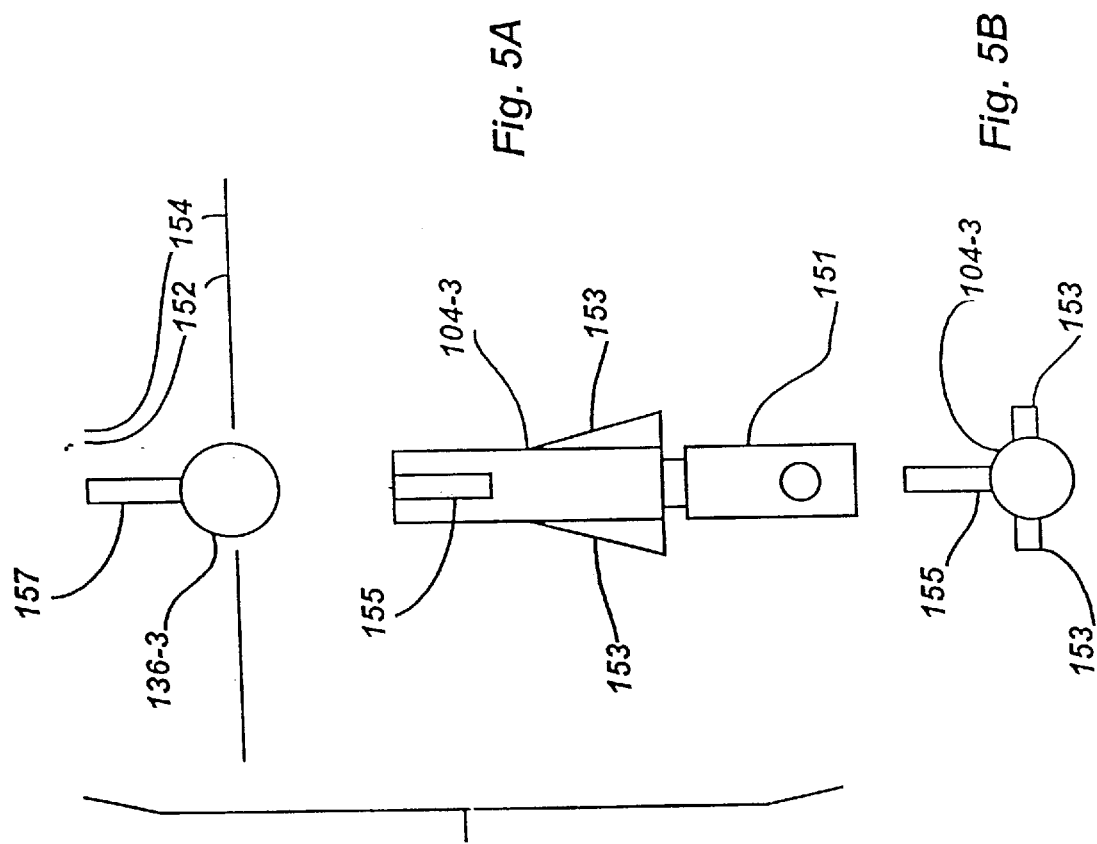

Preferably the receptor 136-1 of FIG. 3 includes at least one locking spring 144. In the embodiment of FIG. 4, the locking springs 146 are also electrodes. When the connector switch 104-2 is inserted into or removed from the receptor 136-2, the metal portion 148 of the connector switch 104-2 passes briefly over the electrodes 146, thereby closing a circuit. When fully inserted into the receptor 146, the insulated portion 150 of the connector switch 104-2 prevents closure of the circuit containing the two electrodes 146.

In the embodiment depicted in FIGS. 5A-5B, the receptor 136-3 contains two separated spring electrodes 152 and 154. The remote control generates and transmits a signal when the circuit containing the two electrodes 152 and 154 is closed. In this embodiment, the connector switch 104-3 has two or more grip wings 153 and a connector fin 155. The connector switch 104-3 is inserted into the receptor 136-3 such that the fin 155 passes through connector fin hole 157. Insertion or removal of the connector switch 104-3, and rotating it ninety degrees, brings together the two electrodes 152, 154 by having the fin 155 push the electrode 152 to touch the electrode 154. The grip wings 153 are used to aid the turning of the connector switch. A rotator 151 allows the key ring to remain stationary while the connector 104-3 is rotated.

In each of the embodiments shown in FIGS. 3-SB, the connector switch 104 has a hole 156 formed therethrough for connection to a key ring 106 (for example, as shown in FIG. 2).

In another embodiment, similar to that shown in FIG. 4, the connector switch 104 performs no electrical function itself and a spring-loaded slider blocks the entrance to the receptor 136. As the connector switch 104 is pushed into the receptor 136, the slider is moved at right angles to the direction of travel of the connector, causing momentary contact to be made between a metal area on its surface and two separated spring electrodes. The contact can also be formed by having a bump on the slider force the two electrodes together momentarily. As the connector moves into its final position, the slider moves back against the neck of the connector, locking it in place. Preferably the head and neck of the connector and the slider are shaped so as to require more force to withdraw the connector than to insert it.

Instead of or in addition to the spring locking mechanisms used to lock the connectors in place, various other locking mechanisms can be used. In some embodiments, locking is achieved using mechanism where two cylinders, one smaller than the other, are locked together by having a protruding ring on the inside of the larger cylinder snap-lock into a circular groove on the outside of the smaller cylinder (or vice versa).

In some embodiments the grooves and rings can be omitted and the parts can be made to fit tightly together.

Alternatively, locking can be achieved by having a freely rotating ring with screw threads on its inside which fits over the connector switch 104. A barrier on the outer surface of the connector switch 104 prevents the ring from coming off the connector. A mating portion corresponding to the ring, with screw threads on its outside, is provided at the entrance to the receptor 136. The connector switch 104 can be locked in place within the receptor 136 by tightening the rotating ring.

In another embodiment, the receptor entrance is blocked by a spring-loaded sliding mechanism. As the sliding mechanism is manually pushed away from the entrance toward the center of the remote control 102, contact is made between two electrodes which, in turn, causes the signal to be generated and transmitted. In this embodiment, the connector has a spherical head, a short stem and a cylinder with a key hole at the other end. The slider mechanism must be held in its end position in order to allow the connector to be inserted. Once inserted, the slider mechanism is released, locking the connector head in place. To release the connector the slider mechanism is moved, held in its end position, the connector is taken out and the slider mechanism is released.

In a variation of the previous embodiment, the entrance to the receptor 136 is obstructed by an L-shaped structure, the horizontal portion of the structure blocking the entrance and being hinged at the end opposite the obstructing part. A spring electrode, with a second electrode below it, keeps the other end of the horizontal part up, obstructing the receptor entrance. A push button is located with its bottom touching the horizontal part of the L-shaped structure at about its middle point. When the push button is depressed against the force of the spring electrode the receptor entrance obstruction is moved down, the electrodes make contact and the connector is inserted. When the push button is released, the electrodes separate, the obstruction moves back up and the connector head locks in. The same procedure is used to remove the connector.

The above embodiments of the connector switch use methods that generate an electrical pulse by forming a temporary contact during insertion/removal of the connector from the remote control. In another embodiment, a magnet in the connector and a coil in the receptor are used in conjunction such that motion of the connector relative to the receptor induces a current in the receptor's coil. This induced current is used to cause the remote control to transmit the appropriate signal.

As noted above, in all of the above embodiments the connector switch 104 can have a hole in it so that it can be connected to a key ring, for example, key ring 106 with key 108 in FIG. 2.

In a further embodiment of this invention a key ring having a gap is provided. A key or a second key ring is attached to the key ring with the gap. The key ring with the gap fits through a circular passage in the remote control 102, with the gap normally in the center line of the remote control. A fin or like structure at the bottom of the stem of a push button sits in the gap and prevents the ring from being rotated. Depressing the push button moves the fin down, out of the gap and also causes contact to be made between two spring electrodes under the push button stem. This contact causes the remote control 102 to generate and transmit a signal. The ring is rotated, bringing out the gap through which the key or key ring is extracted. The push button remains in the depressed position until the ring is rotated back and the fin snaps into the gap.

The above designs are not considered exhaustive, and variations on them are contemplated. For example, in the first embodiment (FIG. 2), the roles of connector and receptor may be reversed, with the plug becoming the receptor and the jack the connector. Further, while the described embodiments have normally-open circuits, single pole, single throw switches and other types of switches can be used.

In general operation of this invention, separation of the connector switch 104 from the remote control 102 causes generation of a signal which places a vehicle in valet mode. Generally, re-attaching the connector switch 104 to the remote control 102 causes generation of a signal (which may be the same or a different signal) which places the vehicle in normal mode. However, the processor unit 116 can be programmed to ignore subsequent signals for a period of time (for example, a few seconds). In this way the key can be re-attached without placing the system back into normal mode.

For each of the embodiments described above, the connector switch 104 can be integrated into the master key of the vehicle 110. For example, the connector switch 104 can be formed on the handle of the master key. In this manner, whenever the master key is separated from the remote control 102, the system enters the valet mode.

When self-parking the vehicle, putting it into the valet mode for extra security, and keeping the key, the connector can be reinserted in the receptor if done within an allowed, predetermined number of seconds, but this would run counter to the concept that having the connector in the remote control indicates that the system is in normal mode and having the connector not in the remote control indicates that the system is in valet mode. In order to maintain this concept, the key can be carried separated from the remote control.

Since having these items physically separated may be inconvenient, they could be physically held together by having a key ring pass through the connector or key and another through the remote control, and having these key rings held together by a quick-release key holder. Another way to keep the connector logically (but not physically) separated from the remote control, is to have a passive receptor in the remote control or a key ring going through the remote control on which the passive receptor hangs.

Alternatively, the remote control/connector can have a second locking position, that is, a rest position, without any electrical function. In some of the above-described embodiments, this can be achieved by pulling the connector partly out of the receptor into, for example, a rest position with locking springs. Another way, in the third embodiment, is for the connector to be rotated ninety degrees counter-clockwise and, for example, a leaf spring in the top of the key-fin channel of the receptor acting to prevent the connector from coming out of the receptor without application of force. With all these designs, there is a clearly visible indication that the connector is logically separated from the receptor. This indication can be made, for example, by having a colored band or mark on the outside of the connector which is visible when the connector is in the rest position, but invisible when the connector has been moved all the way into the receptor.

Locking the connector and passive receptor together is done either by the same method used for the active receptor, or by any of the other methods that have been described. The approach used depends on the connector-receptor design that is chosen.

The receptor/connector designs can also be used with a simple receptor, that is, not the remote control, but a much smaller device, without any parts providing an electrical function, in place of the existing quick-disconnect key rings, which are cumbersome to operate. Such a design can be used by all motor vehicles which have master and valet keys.

Another embodiment of this invention is now described with reference to FIG. 6 wherein a keypad (or push buttons 158) of a radio 160 is used to operate the valet mode functions of the vehicle. The keypad can also be, for example, that of the telephone's keyboard or a separate keyboard. In the preferred embodiment, the push buttons 158 of the vehicle's radio 160 function as the keyboard and are used for the operation of the valet function. For example, by way of illustration, a typical car radio 160 with cassette and six station selector buttons 158 can be used. The functions associated with the various selector buttons 158 can be varied depending on how often they are pressed (within a short period of time) and whether they are pressed in combination with other buttons.

The numbered station selector push buttons 158 are already switchable by the "Band" button to AM, FM1 and FM2. In this invention, an additional setting "Valet Mode" is added to the "Band" switch. When set to "Valet Mode" using the "Band" switch button, the station selector switches are connected to an electronic circuit whose primary function is to store numbers, compare them with keyed numbers and control relays which supply current to the various locking mechanisms of the vehicle.

For example, to go into the "Valet Mode" , the radio would be turned on and would be set to the "Valet Mode" by pressing the "Band" switch until the "Valet Mode" is indicated on the radio's display, and the "Scan" button would be depressed two times. This would cause the current path to the trunk opening mechanism, the fuel door opening mechanism, and to the cellular phone, to be cut. The glove compartment would be equipped with an electrical unlocking control like the trunk, and its unlocking circuit would also have its current path cut.

To disable the "Valet Mode" and return to "Normal" a secret number, like a personal identification number (PIN) used in a banking ATM, must be keyed in while the radio is in the "Valet Mode". After the PIN is entered, the "Scan" button must be depressed once.

With the radio in the "Valet Mode," if, after the "Scan" button is depressed once and then the "Side" button is depressed, followed by a depression of the "Scan" button, the trunk opening current path is reenabled. If instead of the "Side" button, the "Source" button is depressed, the fuel door opening current path is re-enabled. If between depressions of the "Scan" button, both the "Side" and "Source" buttons are depressed, both the trunk and fuel door opening current paths are re-enabled. Only a few seconds are allowed for these modifications, so that they cannot be carried out by the valet.

Of course the above combinations of buttons are only provided as examples and are not meant to limit the invention in any way.

Although described above with reference to push buttons of a radio, other forms of data entry, including, but not limited to voice data entry, are also contemplated. For example, the radio (or another separate device) can be equipped with voice-input capabilities in order to receive spoken voice commands, and the processing unit can be programmed to receive and process these spoken commands using voice-recognition techniques. In this way, for example, a vehicle driver can simply say out loud the words "Valet Mode" in order to enter the vehicle's valet mode. Since voicing the PIN aloud is potentially insecure, the system is trained to recognize a particular voice (or voices) and to respond only to those voices. (Alternatively, the voice recognition can be used in conjunction with the button entry to achieve greater security.) Thus, the system will only respond to a recognized voice saying "Exit Valet Mode" or "Enter Normal Mode". Using voice-recognition alone obviates the need for some encryption, although training of the system (to recognize a particular voice) may require entry of a PIN or of some other form of user identification.

The voice-recognition and push-button capabilities of the system can be combined.

Figure 6:
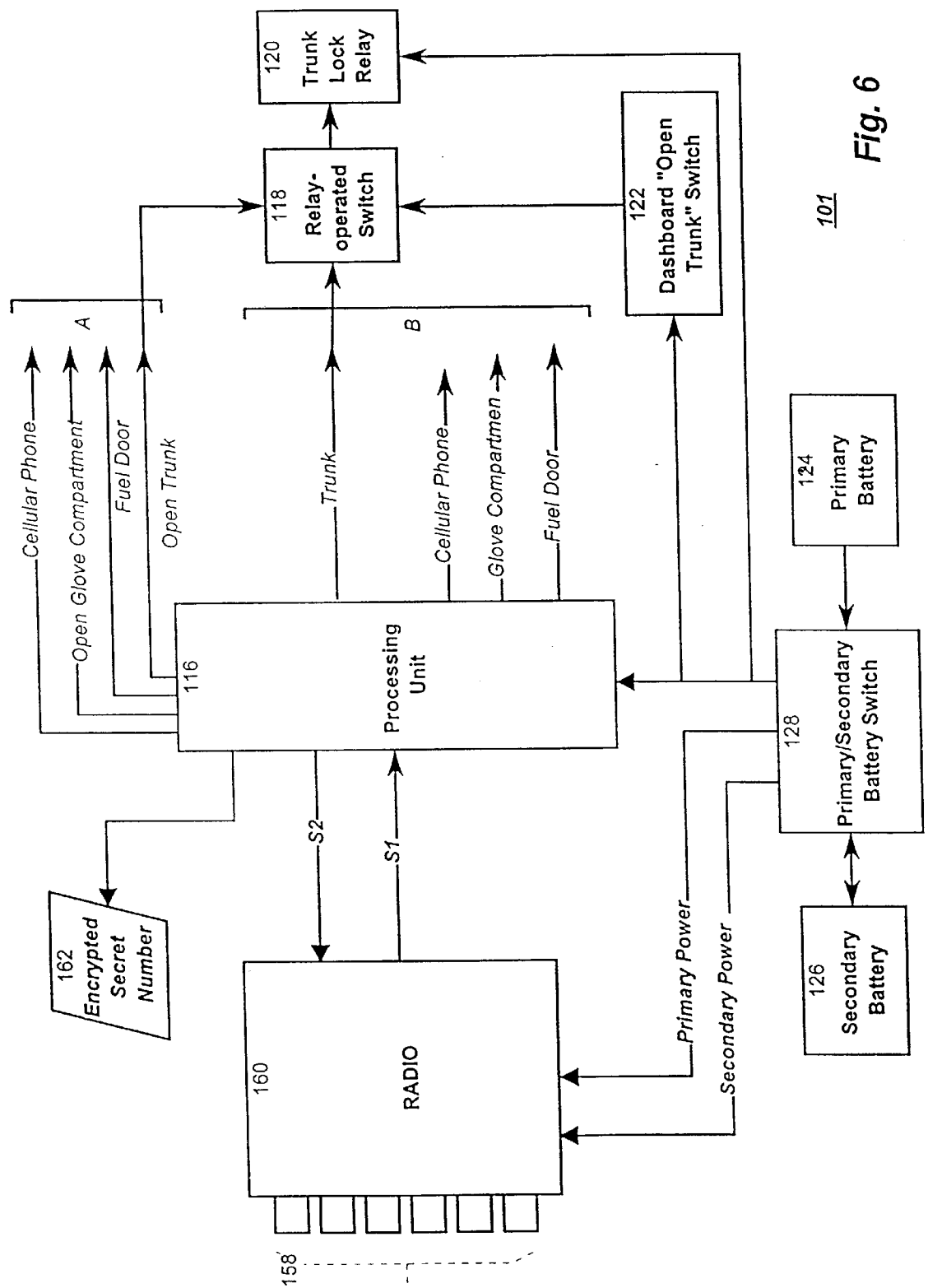
FIG. 6 shows another embodiment of a security system for a vehicle.

This embodiment 101 of FIG. 6 is similar to that of the system 100 shown in FIG. 1, except that commands are sent to the processing unit 116 via a radio 160 rather than the receiver 114 and antenna 112.

The operation of the second embodiment is now described in more detail. When the radio 160 is in "Valet Mode" and its buttons 158 are depressed, it sends signals (e.g., button closing signals denoted Si in FIG. 6) to the processing unit 116. The processing unit 116 interprets the signals S1 in order to control the vehicle's modes. The processing unit 116 sends signals (designated S2 in FIG. 6) back to the radio in response to signals it receives from the radio and in order to provide the radio with the status of the system. In this manner the display of radio 160 can operate as the mode indicator 132 of the first embodiment. Thus, for example, in the system 101 which uses the vehicle's radio 160, the status of the system 101, (that is, "Normal", "Valet Mode", etc.), with symbols indicating which units have their current path cut, can be shown on the radio's display. Also, audible signals, such as a chirp that signals that a radio push button has been set to tune in a new radio frequency, are used to indicate proper entry of numbers. In some embodiments the change in status can be announced by a digitized voice message played through a loudspeaker.

Part of the processing performed by the processing unit 116 is to compare an entered secret number to a stored secret number. That is, part of the processing by the processing unit 116 includes comparing the secret PIN number entered via the buttons to a stored secret number in order to limit unauthorized access to certain components of the vehicle. In some embodiments the stored values, for example, of the PIN, are encrypted. In such cases, the user is able to retrieve the encrypted PIN 162, but not a decrypted version.

The PIN can be of variable length, preferably up to eight digits long. The PIN is preferably factory set and changeable by the user. For example, the number could be factory set to say "1111 "or the factory could chose a secret number, register it in association with that particular radio 160 or processing unit 116 and then convey it to the motor vehicle owner in a sealed envelope with the vehicle's instruction manual. To insert a different number or to change the current number, the radio must be turned on, set to "Valet Mode" (via the "Band" switch), the "Scan" button is then pressed, e.g., once, and then the current value of the secret number is entered. Following this a new secret number can be entered, followed by another depression of the "Scan" button. The system 101 remains in the same state that it was in before the secret number was changed. This method of changing the secret number is given only by way of example, and it is clear that other ways of changing the number are contemplated and possible. If the processing unit 116 stores the secret number in encrypted form then it must also encrypt the new secret number before storing it. (Note, this requires that (a) the processing unit perform the encryption and, more importantly, (b) that the processing unit know the encryption key with which the number must be encrypted. In this case, the key should be in a protected portion of the processing unit so that it cannot be obtained.) Since the typical radio 160 has six buttons 158, the secret numbers will generally use the digits 1 to 6. Using a four digit long PIN gives 1,296 different numbers from which to select, whereas five digits gives 7,776 possible PINs.

If a user forgets his secret PIN, the system can retrieve it. As noted earlier, to prevent unauthorized retrieval of the PIN, the PIN is preferably encrypted before being stored in the processing unit 116. The PIN is preferably encrypted using the Data Encryption Standard (DES) with a key specific to the particular vehicle. The particular key used for each vehicle can be stored by the manufacturer.

The preferred method of retrieving the secret number is to read it out of the processing unit's storage and display it on the radio display. The user could then write down the displayed number and provide it to the manufacturer who could decrypt it with the key corresponding to the vehicle's encryption key. A key sequence, e.g., keying in "0000" , can be used in "Valet Mode" to get the system to display the PIN.

Alternatively, a vehicle dealer could read out the encrypted PIN from the processing unit 116 by attaching an analyzer in the same way as is used to read out other stored engine data.

Information required by the system, for example, the secret PIN, is stored in integrated circuit memory devices that retain the values even when power is cut off.

As with the earlier embodiments, in order to prevent by-passing of the current path cutting features and applying electricity to the conductors leading to the locks, these conductors and the processing unit 116 are made as inaccessible as possible.

In case of a power failure, for example from a dead battery, the same system is used as for the earlier embodiments except that the radio 160 is designed so that when the power is supplied by the secondary, preferably rechargeable, battery, in order to minimize current drain, only those circuits necessary to operate the security system 101 are supplied with power.

Alternatively, the radio can be designed to have a low-power-consumption audio power amplifier, not normally connected to a loudspeaker. When the primary battery fails, the high-power-consumption audio power amplifiers are automatically disconnected and the low-power-consumption audio power amplifier is automatically connected to a loudspeaker. This would result in a low-power-consumption radio, which, in an emergency, could be kept turned on for a long time.

Thus, as shown in FIG. 6, the radio 160 has two power connections to the primary/secondary battery switch 128. When the switch 128 cuts off the primary battery 124, a relay coil in the radio connected to the primary power input is de-energized, switching the radio to the lowpower consumption mode, with power supplied from the secondary power input.

Note that the remote control/connector embodiment can be combined with the radio embodiment to provide an enhanced vehicle control system incorporating the features of both systems.

While the invention provides advantages and improvements over the dual-key valet systems, it is contemplated that the present invention can be used in conjunction with a dual-key valet system. In such cases either or both the valet key or the system of this invention can be used to switch modes.

While the invention has been described with respect to a motor vehicle, its use is not limited to such vehicles and it is contemplated that the single-key security system according to this invention will have other applications in other environments, including, but not limited to building security.

Thus, a single-key security system is provided. One skilled in the art will appreciate that the present invention can be practiced by other than the described embodiments, which are presented for purposes of illustration and not limitation, and the present invention is limited only by the claims that follow.

I claim:

1. A system for restricting access to certain components of a vehicle, the vehicle having a first mode wherein access to the certain components of the vehicle is restricted and a second mode wherein the certain components are made accessible, the vehicle having a processor programmed to place the vehicle in the first mode upon receipt of a first signal and to place the vehicle in the second mode upon receipt of a second signal, the system comprising:
   a remote control; and
   connector removably connected to the remote control, wherein removal of the connector from the remote control causes transmission of the first signal to thereby restrict access to said certain components upon said removal.

2. A system as in claim 1 wherein reconnection of the connector to the remote control causes the transmission of the second signal to make said certain components accessible.

3. A system as in claim 2 wherein the second signal is not tranmitted if the connector is reconnected to the remote control within a predetermined time of it having been removed from the remote control.

4. A system as in claim 1, wherein the remote control comprises:
   a mode change button causing alternate transmission of the first mode signal and the second mode signal when the mode change button is depressed.

5. A system as in claim 1 further comprising:
   a voice-rocognition mechanism constructed and adapted to send the second mode signal to the processor when a command is spoken.

6. A system as in claim 5 wherein the voice-recognition mechanism is in a radio of the vehicle.

7. A system as in claim 5 wherein the processor only responds to commands from particular persons.

8. A system as in claim 1 wherein the connector is integrated into a key of the vehicle.

9. A system as in claim 1 wherein the component is selected from the group consisting of the trunk, glove compartment, fuel tank and mobile phone.

10. A system as claimed in claim 9 wherein access is restricted to two or more of said components.

11. A system as in claim 1 wherein the connector is integrated into a key of the vehicle.

12. A system as in claim 1 but without a connector and comprising a key ring hanging on a second ring with a gap, non-removably incorporated into a receptor, but rotatble through a circular channel in the receptor, wherein depression of a remote control button, normally preventing the rotation of the receptor ring, causes transmission of a signal and allows a rotation of the receptor ring to a position where the key ring can be moved through the gap in the receptor ring.

13. A system as in claim 12 wherein the receptor comprises a button and wherein depressing the button allows the receptor ring to rotate and causes the receptor to transmit a signal.

14. A system as in claim 1 wherein the remote control comprises a mode change button operable to transmit only the second mode signal.

15. A method of controlling access to certain components of a vehicle using a controlling system, the vehicle having a first mode wherein certain components of the vehicle are inaccessible and a second mode wherein the certain components are accessible, the vehicle having a processor programmed to place the vehicle in the first mode upon receipt of a first mode signal and to place the vehicle in the second mode upon receipt of a second mode signal, the controlling system comprising a remote control; and a connector switch removably connected to the remote control, wherein removal of the connector from the remote signal control causes the controlling system to automatically transmit the first mode signal to thereby render said certain components inaccessible, the method comprising:
   disconnecting the connector from the remote control, whereby the first mode signal is automatically tranmitted to the vehicle and the vehicle is placed in the first mode to thereby restrict access to said certain components and thereafter reconnecting said connector with said remote control to transmit the second mode signal to make said certain components accessible.

16. A vehicle security system for controlling access to components of a vehicle comprising, in combination:
   a remote control;
   a key ring having a connector removably connected to the remote control and means for tranmitting a signal when the connector is removed from the remote control to render said component inaccessible.

17. A system as in claim 16, including means for transmitting another signal when the connector is reconncted to the remote control so as to render said components accessible.

18. A system as in claim 16 further comprising:
   a processing unit adapted to receive signals, the processing unit being programmed to automatically place the vehicle in a first mode upon receipt of a first mode signal and to place the vehicle in a second mode upon receipt of a second mode signal, wherein the signal tranmitted when the connector is removed from the remote control is the first mode signal, and wherein the signal transmitted when the connector is reconnected to the remote control is the second mode signal.

19. A system as in claim 18 further comprising:

a radio including means for sending the second mode signal to the processing unit when a button of the radio is pressed to enter a secret code number.

20. A system as in claim 19 wherein the radio has a high power consumption mode and a low power consumption mode, the system further comprising: a primary battery and a secondary battery; and a battery switch for selectively supplying power to the radio from one of the primary battery and the secondary battery, the battery switch automatically switching power from the primary battery to the secondary battery when the voltage from the primary battery drops below a predetermined level, wherein the radio automatically enters the low power consumption mode when power is supplied to the radio from the secondary battery.

21. A system as in claim 19 wherein the processing unit stores an identifier and wherein the processing unit only responds to mode changing signals when the identifier has been provided to it using buttons on the radio.

22. A system as in claim 21 wherein the processing unit stores an encrypted version of the identifier.

23. A system as in claim 19 wherein the radio is automatically switched to a low power consumption mode comprising a system specific power source when the primary power source is inadequate.

24. A system as in claim 18 wherein the remote control comprises a button and wherein the remote control transmits the second mode signal when the button is depressed, whereby the procesing unit, upon receipt of the second mode signal, places the vehicle in the second mode.

25. A system as in claim 18 further comprising a primary battery and a secondary battery, and a battery switch for selectively supplying power to the system from one of the primary battery and the secondary battery, the battery switch automatically switching power from the primary battery to the secondary battery when the voltage from the primary battery drops below a predetermined level.

26. A system as in claim 16 wherein a vehicle key hangs on the key ring.

27. A kit comprising;

a pair of keys for a vehicle, one of the keys allowing only restricted access to certain components of the vehicle, and the other of the keys allowing unrestricted access to all components of the vehicle;

a receptor adapted to hold one of the keys;

a key ring adapted to hold the other of the pair of keys, the key ring having a connector removably connected to the receptor, whereby separation of receptor and connector causes automatic transmission of a signal for allowing only limited access to said components.

28. A system as in claim 27 wherein connection of said receptor and said connector causes transmission of a signal.

* * * * *